(12) United States Patent
Zarraonandia

(10) Patent No.: US 11,326,336 B2
(45) Date of Patent: May 10, 2022

(54) TRASH COLLECTING UNDERGROUND STORMWATER MANAGEMENT SYSTEM

(71) Applicant: Pre-Con Products, Simi Valley, CA (US)

(72) Inventor: David Zarraonandia, Thousand Oaks, CA (US)

(73) Assignee: Pre-Con Products, Simi Valley, CA (US)

( * ) Notice: Subject to any disclaimer, the term of this patent is extended or adjusted under 35 U.S.C. 154(b) by 0 days.

(21) Appl. No.: 17/065,610

(22) Filed: Oct. 8, 2020

(65) Prior Publication Data
US 2022/0112705 A1   Apr. 14, 2022

(51) Int. Cl.
*E03F 5/14*   (2006.01)
*B01D 21/00*   (2006.01)
*E03F 5/10*   (2006.01)

(52) U.S. Cl.
CPC .............. *E03F 5/14* (2013.01); *B01D 21/003* (2013.01); *B01D 21/0012* (2013.01); *B01D 21/0069* (2013.01); *E03F 5/101* (2013.01); *B01D 2221/12* (2013.01)

(58) Field of Classification Search
CPC ... E03F 1/00; E03F 5/101; E03F 5/105; E03F 5/14; B01D 21/0012; B01D 21/003; B01D 21/0033
USPC .... 210/170.03, 299, 308, 309, 532.1, 747.2, 210/747.3
See application file for complete search history.

(56) References Cited

U.S. PATENT DOCUMENTS

| | | | | |
|---|---|---|---|---|
| 6,749,746 B2 * | 6/2004 | Mokrzycki | ........... | E03F 5/0404 210/170.03 |
| 6,991,734 B1 * | 1/2006 | Smith | ..................... | E03F 1/002 210/170.03 |
| 7,374,364 B2 * | 5/2008 | Allard | ...................... | E03F 1/00 210/170.03 |
| 7,540,954 B2 * | 6/2009 | An | ..................... | B01D 21/0012 210/170.03 |
| 8,062,531 B1 * | 11/2011 | LoBello | ................. | E03F 1/005 210/747.2 |

(Continued)

FOREIGN PATENT DOCUMENTS

EP   2508686   * 10/2012

*Primary Examiner* — Christopher Upton
(74) *Attorney, Agent, or Firm* — Thompson Coburn LLP

(57) ABSTRACT

An underground stormwater management system comprising a sediment settling chamber, a plurality of stormwater management cells, and a trash capturing net. The sediment settling chamber has a sediment settling chamber floor and a discharge port located at a higher elevation than the sediment settling chamber floor. The plurality of stormwater management cells are located adjacent each other, and each cell comprises a body portion and an internal region, and is adapted to permit passage of stormwater into and out of the internal region of such cell. The plurality of stormwater management cells combine to form a stormwater management chamber downstream of the sediment settling chamber and in fluid communication with the sediment settling chamber. The trash capturing net is at least partially located within the stormwater management chamber and is adapted and configured to capture trash and debris in stormwater discharged from the discharge port.

20 Claims, 11 Drawing Sheets

(56) References Cited

U.S. PATENT DOCUMENTS

| | | | |
|---|---|---|---|
| 8,623,203 B2* | 1/2014 | Peters, Jr | E03F 5/14 210/170.03 |
| 2006/0163130 A1* | 7/2006 | Happel | E03F 5/14 210/532.1 |
| 2013/0193045 A1* | 8/2013 | Vreeland | E03F 5/14 210/170.03 |
| 2018/0106029 A1* | 4/2018 | Napierski | E03F 5/14 |

* cited by examiner

TRASH COLLECTING UNDERGROUND STORMWATER MANAGEMENT SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to an underground stormwater management system.

SUMMARY

One aspect of the disclosure is an underground stormwater management system comprising a sediment settling chamber, a plurality of stormwater management cells, and a trash capturing net. The sediment settling chamber has a sediment settling chamber floor and a discharge port located at a higher elevation than the sediment settling chamber floor. The plurality of stormwater management cells are located adjacent each other. Each cell of the plurality of cells comprises a body portion and an internal region. Each of the plurality of cells is adapted to permit passage of stormwater into and out of the internal region of such cell. The plurality of stormwater management cells combine to form a stormwater management chamber that has a chamber floor. The stormwater management chamber is downstream of the sediment settling chamber. The stormwater management chamber is in fluid communication with the sediment settling chamber via the discharge port. The trash capturing net is at least partially located within the stormwater management chamber. The trash capturing net is adapted and configured to capture trash and debris in stormwater discharged from the discharge port.

Another aspect of the disclosure is an underground stormwater management system comprising a sediment settling chamber, a plurality of stormwater management cells, a riser, a riser intake pipe portion, a riser discharge pipe portion, a filter sleeve, and a flow control orifice. The sediment settling chamber has a sediment settling chamber floor and a discharge port located at a higher elevation than the sediment settling chamber floor. The plurality of stormwater management cells are located adjacent each other. Each cell of the plurality of cells comprises a body portion and an internal region. Each of the plurality of cells is adapted to permit passage of stormwater into and out of the internal region of such cell. The plurality of stormwater management cells combine to form a stormwater management chamber that a chamber floor. The stormwater management chamber is downstream of the sediment settling chamber. The stormwater management chamber is in fluid communication with the sediment settling chamber via the discharge port. The riser extends from the chamber floor of the stormwater management chamber to a riser height. The riser has an internal riser chamber. The riser intake pipe portion is within the stormwater management chamber and is in fluid communication with the riser chamber. The filter sleeve surrounds a length of the riser intake pipe portion. The flow control orifice is adapted and configured to control flowrate of stormwater flowing through the riser intake pipe portion. The riser height is the maximum desired stormwater level of the stormwater management chamber. The riser is adapted and configured to allow stormwater exceeding the riser height to flow into the riser chamber without first flowing through the riser intake pipe portion. The riser discharge pipe portion is in fluid communication with the riser chamber. The riser discharge pipe portion is adapted and configured to discharge stormwater from the riser chamber to out of the stormwater management chamber.

Yet another aspect of the disclosure is an underground stormwater management system comprising a sediment settling chamber, a plurality of stormwater management cells, a trash capturing net, and at least one weir wall. The sediment settling chamber has a sediment settling chamber floor, a discharge port located at a higher elevation than the sediment settling chamber floor, and an overflow port located at a higher elevation than the discharge port. The plurality of stormwater management cells are located adjacent each other. Each cell of the plurality of cells comprises a body portion and an internal region. Each of the plurality of cells is adapted to permit passage of stormwater into and out of the internal region of such cell. The plurality of stormwater management cells combine to form a stormwater management chamber that has a chamber floor. The stormwater management chamber is downstream of the sediment settling chamber. The stormwater management chamber is in fluid communication with the sediment settling chamber via the discharge port. The trash capturing net is at least partially located within the stormwater management chamber. The trash capturing net is adapted and configured to capture trash and debris in stormwater discharged from the discharge port. The at least one weir wall is located downstream of the trash capturing net. The weir wall is adapted and configured to regulate the flow of stormwater in the stormwater management chamber so as to promote settlement of sediment or other particulate matter in the stormwater.

Further features and advantages, as well as the operation, are described in detail below with reference to the accompanying drawings.

Figure 1:
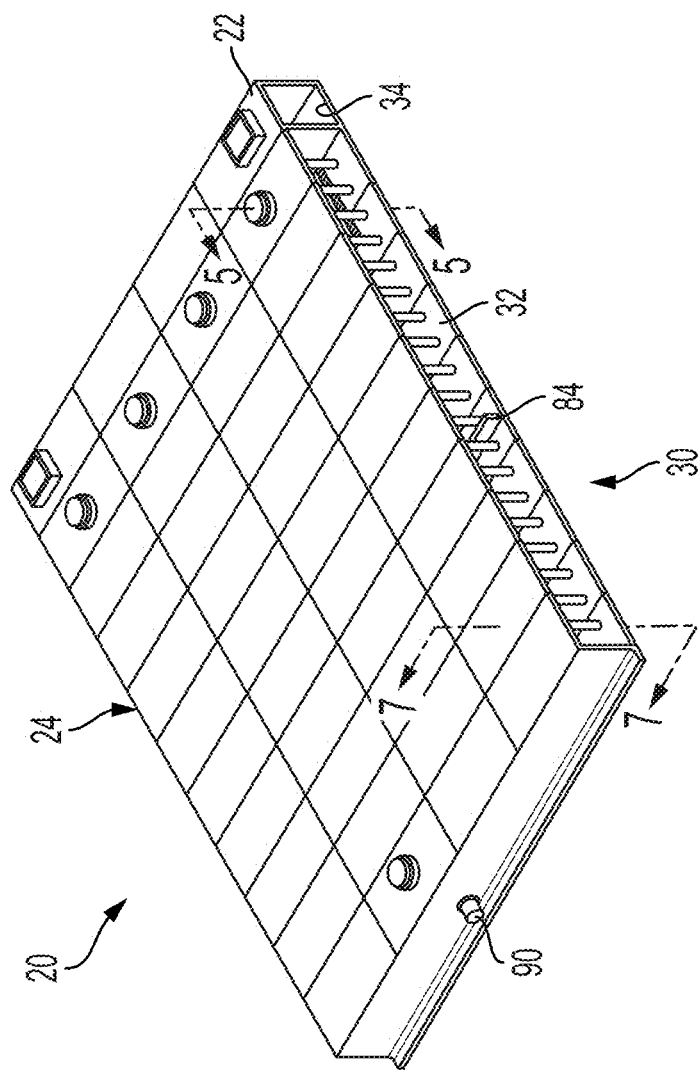
FIG. 1 is a perspective view of a partial underground stormwater management system comprising a plurality of stormwater management cells.
Figure 2:
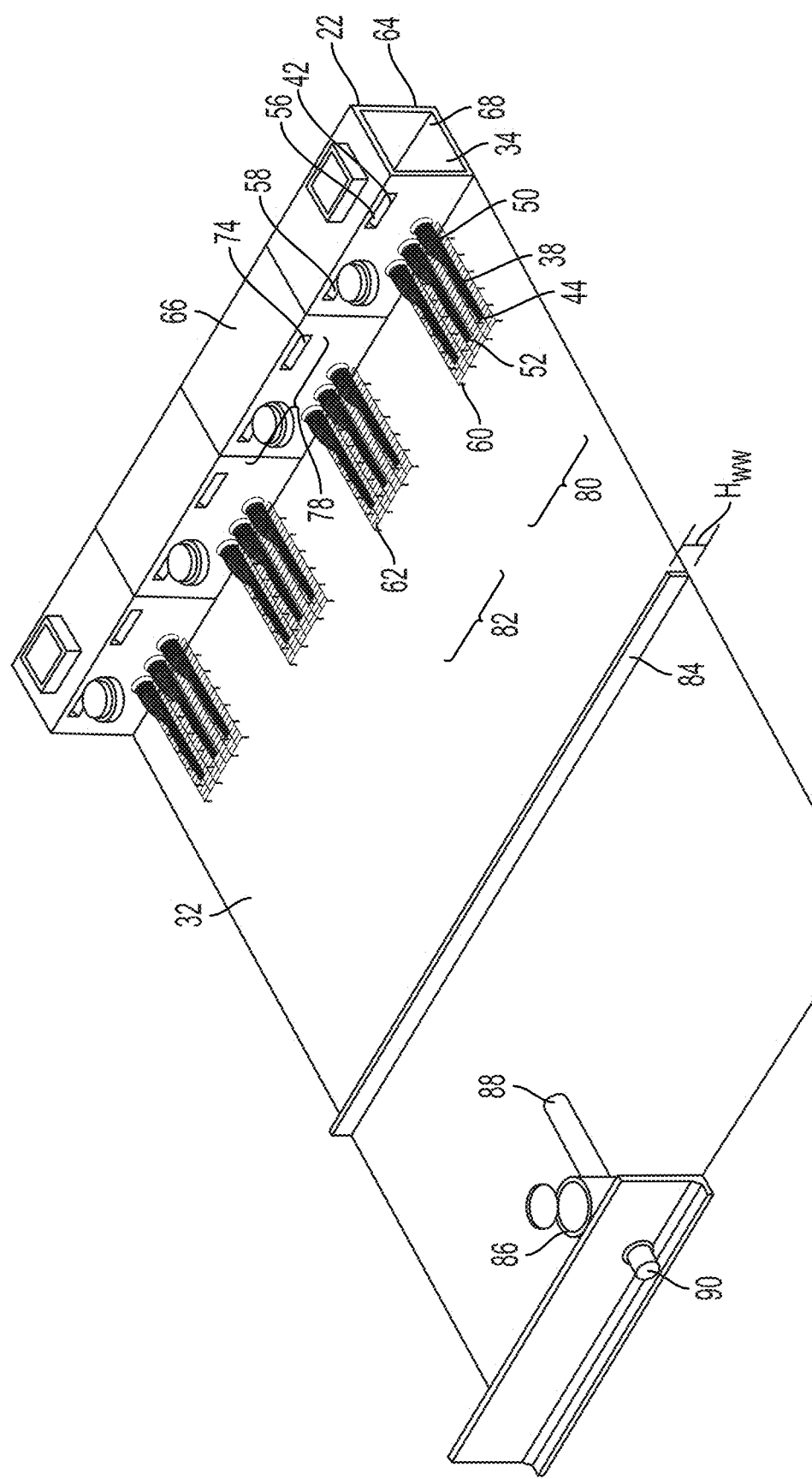
FIG. 2 is a perspective fragmented view of the underground stormwater management system of FIG. 1 with portions removed to show details of the interior.

Reference numerals in the written specification and in the figures indicate corresponding items.

DETAILED DESCRIPTION

Figure 3:
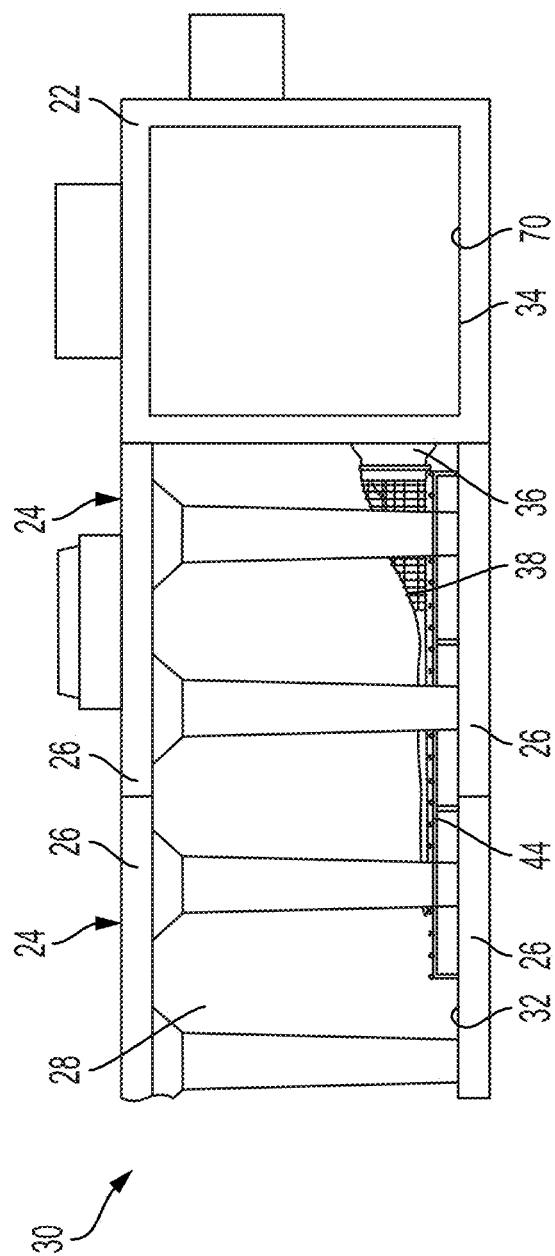
FIG. 3 is a partial side elevational view of the underground stormwater management system of FIG. 1.
Figure 4:
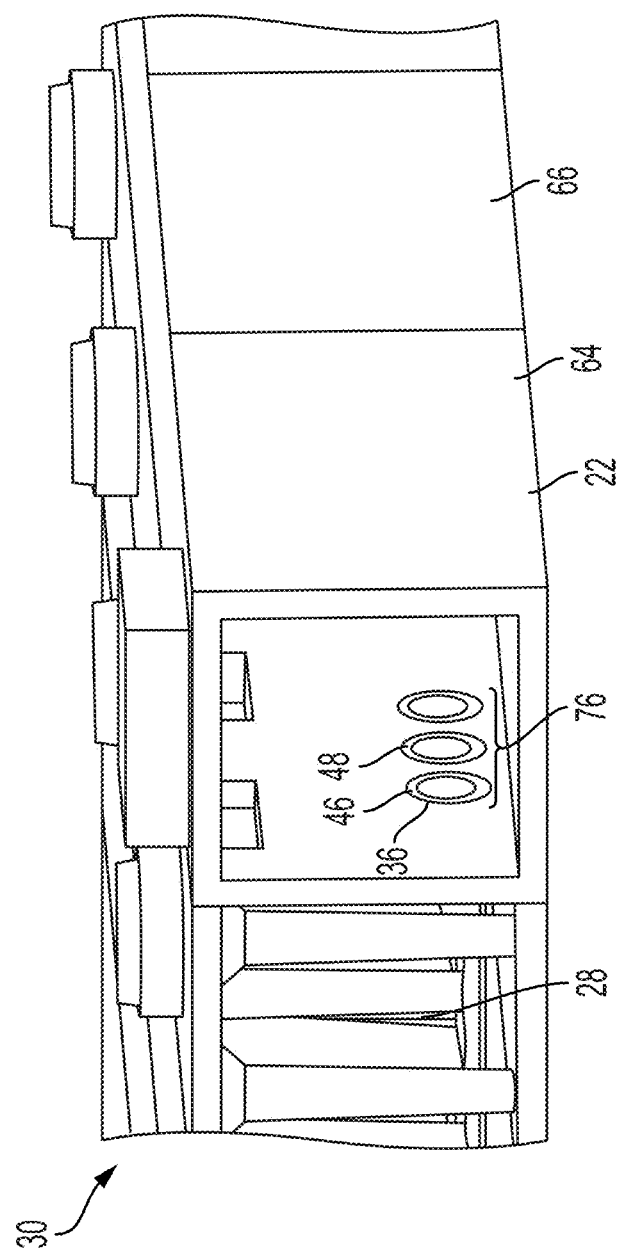
FIG. 4 is a partial perspective view of the underground stormwater management system of FIG. 1.
Figure 5:
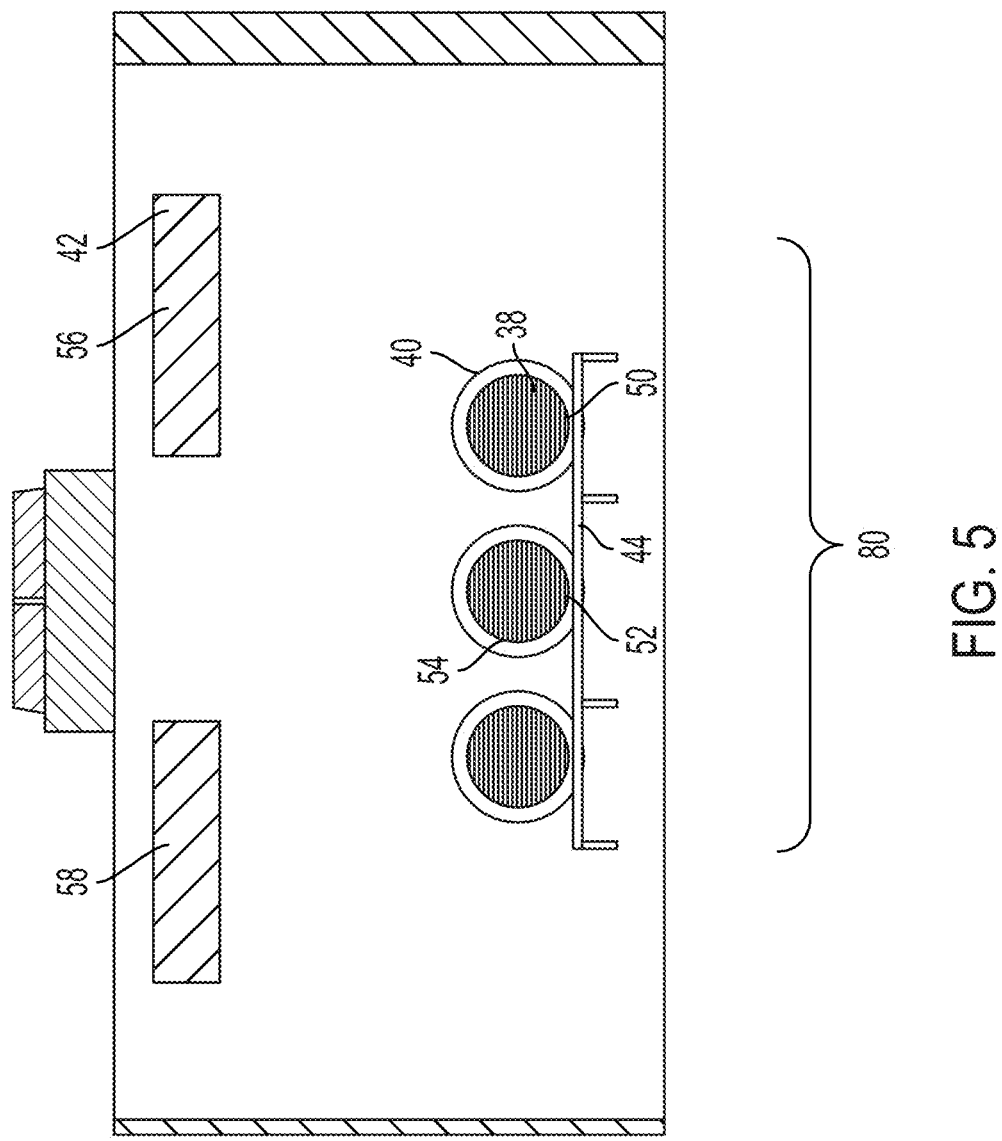
FIG. 5 is a cross-sectional view taken along the plane of line 5-5 of FIG. 1 showing a sediment settling chamber of the underground stormwater management system of FIG. 1.
Figure 6:
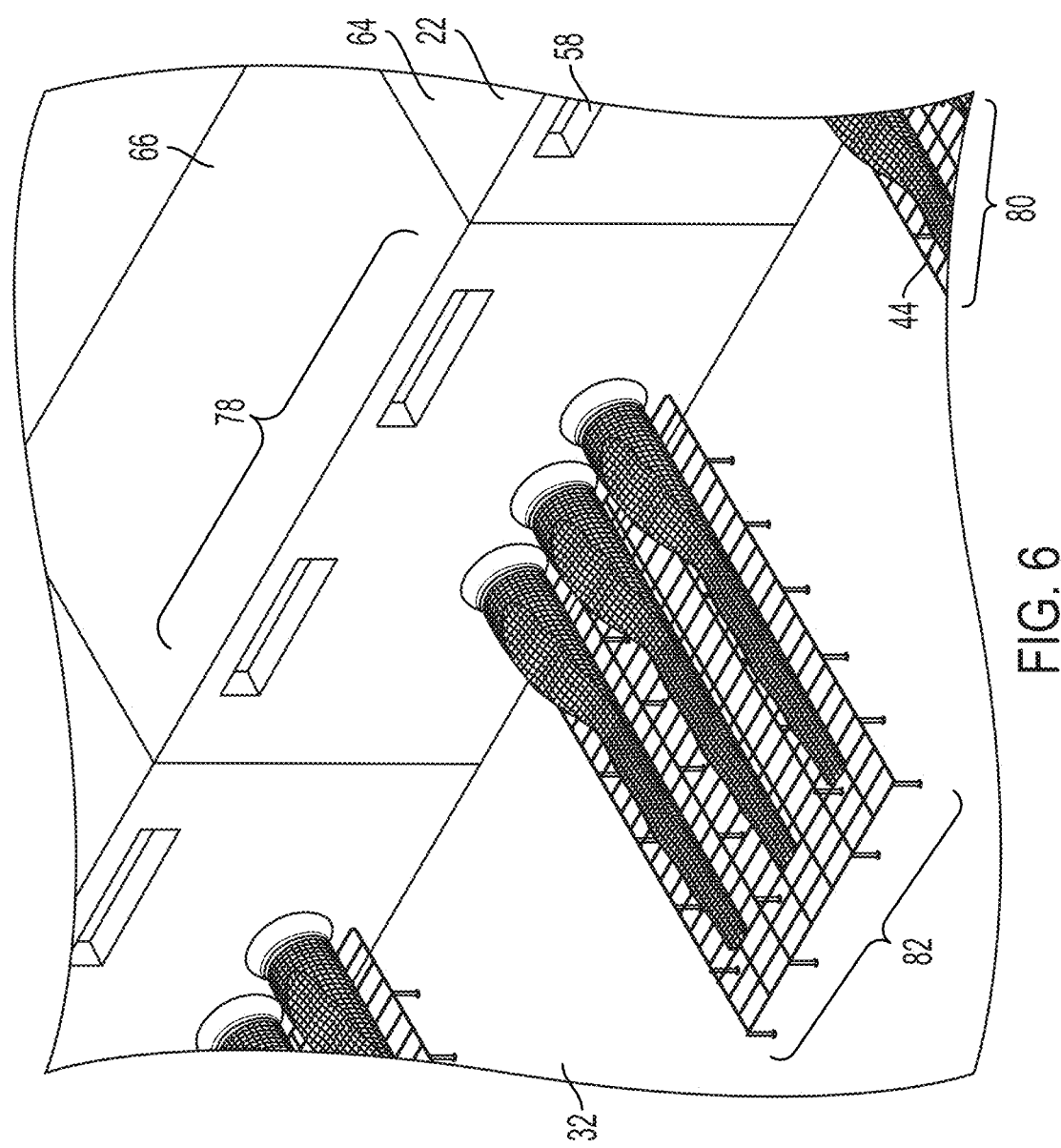
FIG. 6 is an enlarged, fragmented, perspective view of several sediment settling chambers of the underground stormwater management system of FIG. 1.
Figure 7:
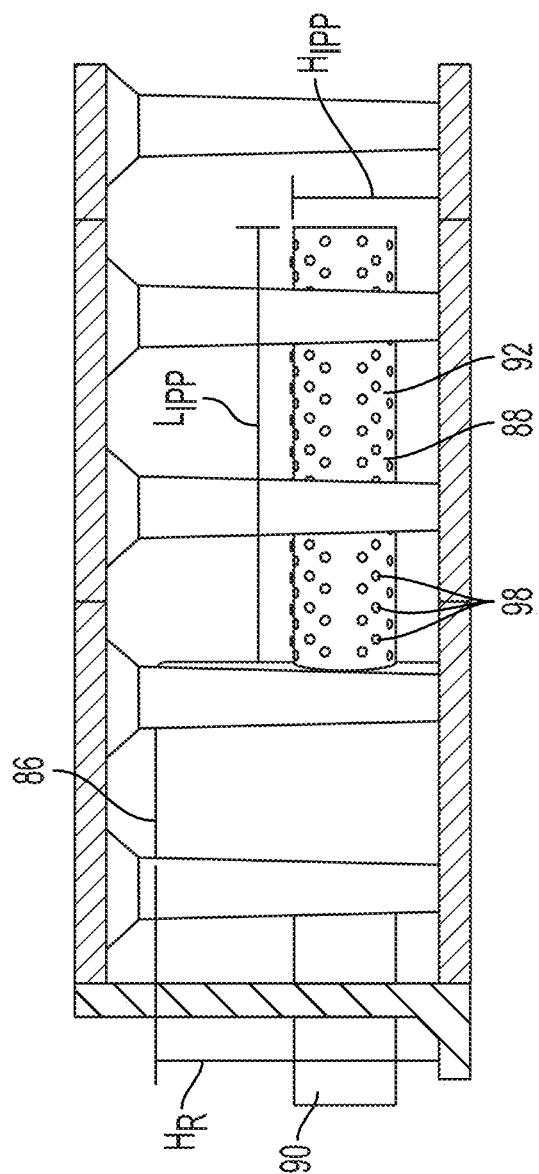
FIG. 7 is a cross-sectional view taken along line 7-7 of FIG. 1 showing the riser of the underground stormwater management system of FIG. 1.
Figure 8:
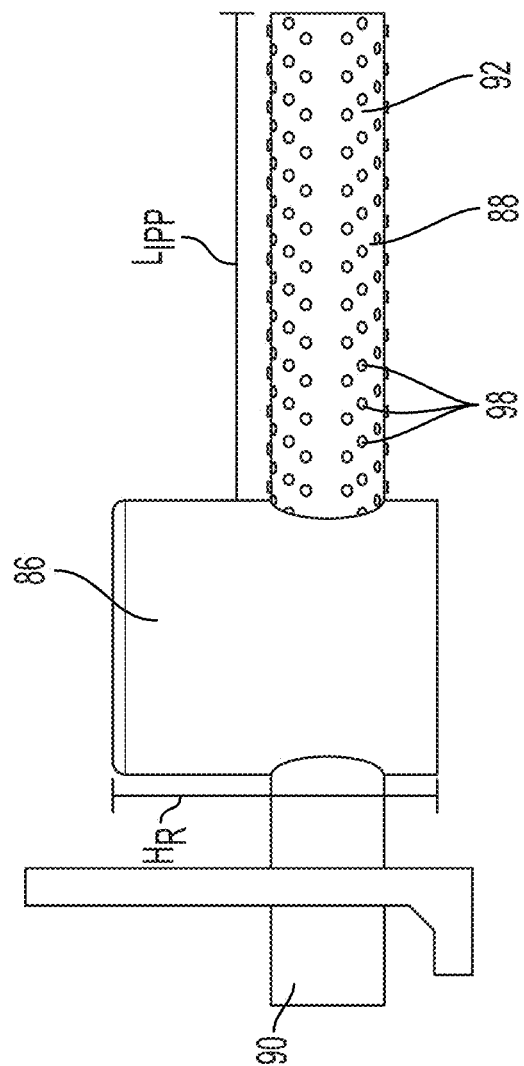
FIG. 8 is a side view of the riser of FIG. 7.
Figure 9:
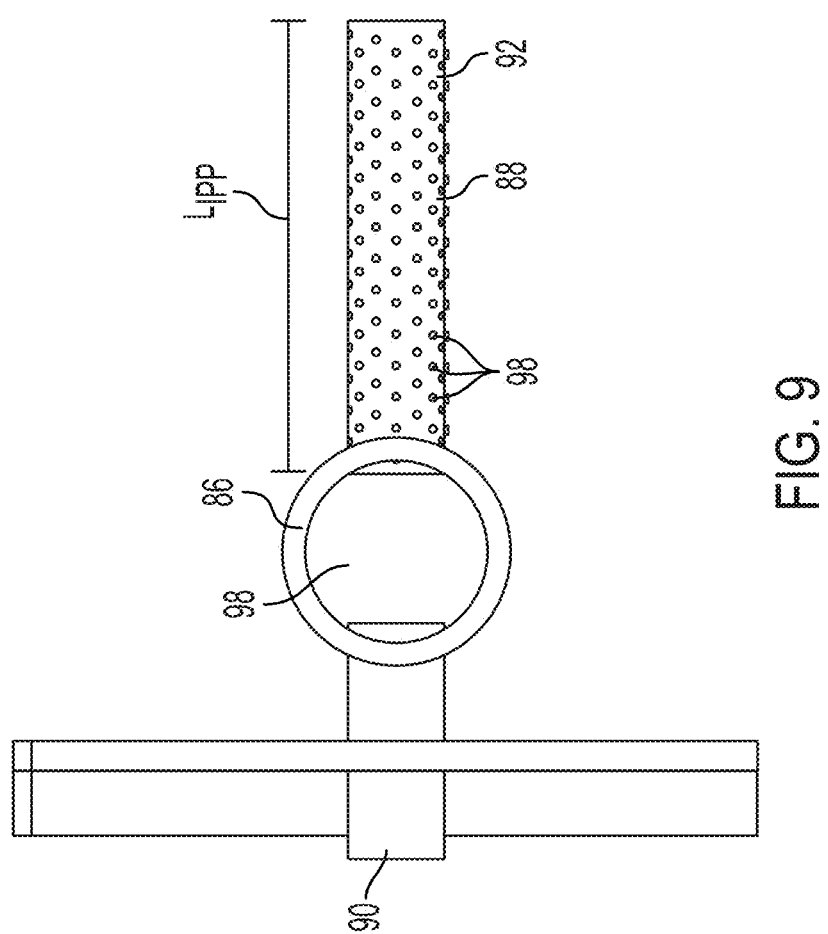
FIG. 9 is a top view of the riser of FIG. 8.
Figure 10:
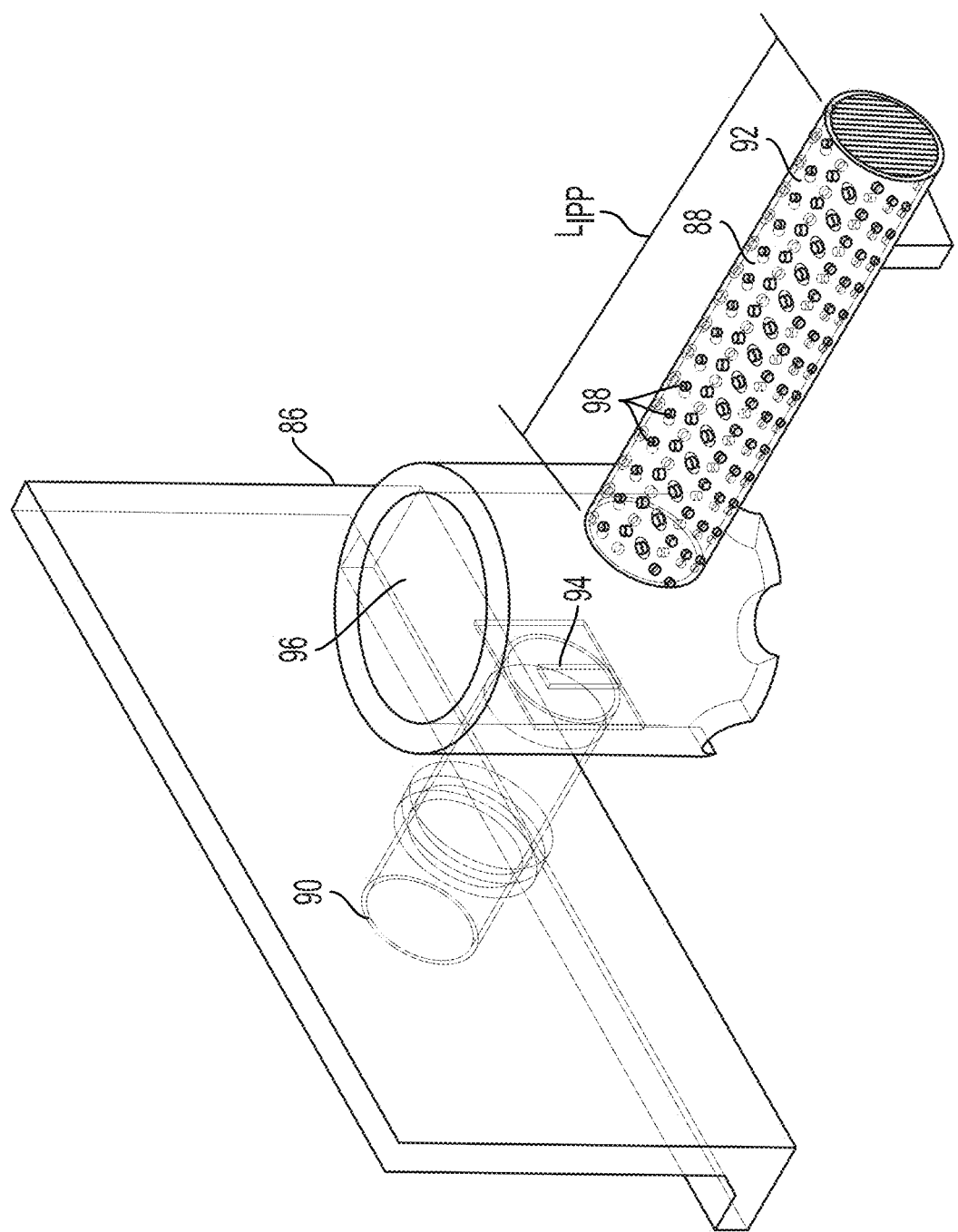
FIG. 10 is a perspective view of the riser of FIGS. 7-9, with the riser shown in phantom to show details.
Figure 11:
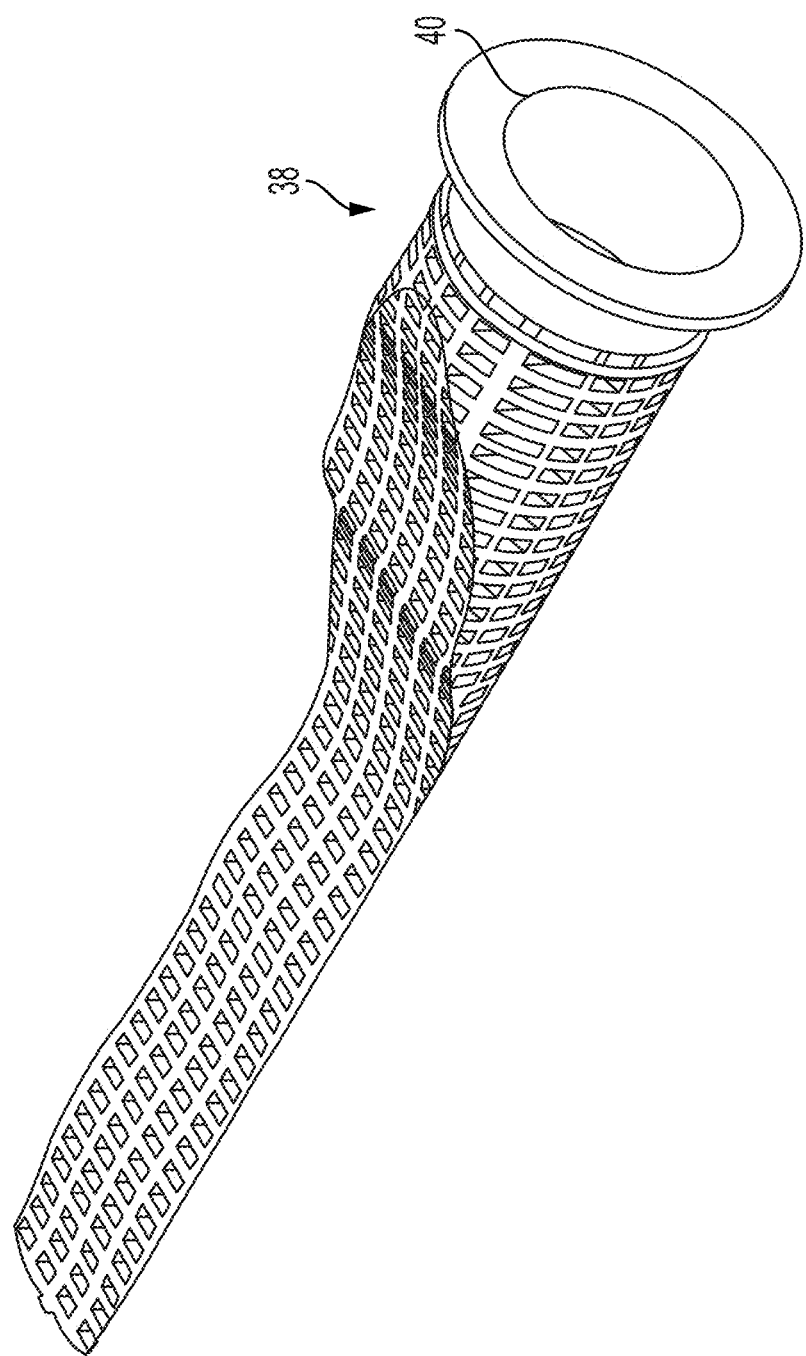
FIG. 11 is a perspective view of a trash capturing net of the stormwater management system of FIG. 1.

FIG. 1 shows an underground stormwater management system, generally indicated by the reference number 20, comprising a sediment settling chamber 22 and a plurality of stormwater management cells located adjacent each other, generally indicated by the reference number 24. Each cell 24 (see FIG. 3) of the plurality of stormwater management cells comprises a body portion 26 and an internal region 28. Each of the plurality of stormwater management cells 24 are adapted to permit the passage of stormwater into and out of the internal region 28 of such cell. The stormwater management system further includes a chamber floor 32.

Referring to FIGS. 2-6 and 11, the sediment settling chamber 22 has a sediment settling chamber floor 34 and at least one discharge port 36. The discharge port 36 is located at a higher elevation than the sediment settling chamber floor 34. Thus, stormwater flowing into the sediment settling chamber 22 remains within the sediment settling chamber 22 until the stormwater reaches the elevation of the discharge port 36. This promotes the settling of sediment on the sediment settling chamber floor 34 such that the stormwater flowing through the discharge port 36 generally has less sediment in it than the stormwater flowing into the sediment settling chamber 22. The stormwater management chamber 30 is in fluid communication with the sediment settling chamber 22 via the discharge port 36.

The underground stormwater management system 20 further comprises a trash capturing net 38 that is at least partially located within the stormwater management chamber 30. The trash capturing net 38 is adapted and configured to capture trash and debris in stormwater discharged from the discharge port. Preferably, the trash capturing net 38 has a mouth opening 40 (see FIG. 5) having a mouth area between 100 and 500 square inches. When the trash capturing net 38 is full, it may be removed, emptied, and reinstalled.

The sediment settling chamber 22 may also comprise an overflow port 42 located at a higher elevation than the discharge port 36. The overflow port 42 is positioned and configured to allow stormwater reaching the elevation of the overflow port 42 and passing through the overflow port 42 to flow into the stormwater management chamber 30 without passing through the trash capturing net 38. This enables stormwater to continue to flow through the underground stormwater management system 20 when the flow rate of stormwater entering the underground stormwater management system 20 exceeds the flow rate of stormwater through the discharge port 36, such as when the trash capturing net 38 is full.

The underground stormwater management system 20 may further comprise a net stand 44. The net stand 44 supports the trash capturing net and elevates the trash capturing net above the chamber floor 32 of the stormwater management chamber 30. Preferably, the net stand 44 elevates the trash capturing net 38 at least four inches above the elevation of the chamber floor (32) of the stormwater management chamber (30).

It should be understood that, depending on the intended flow rate of the underground stormwater management system 20, the underground stormwater management system 20 may comprise one or more sediment settlement chambers 20. Additionally, the discharge port 36 of each sediment settling chamber 20 may comprise a plurality of discharge ports. Similarly, the overflow port 42 of each sediment settling chamber 20 may comprise a plurality of overflow ports. The trash capturing net 38 may comprise a plurality of trash capturing nets, and the net stand 44 may comprise a plurality of net stands.

For example, the discharge port (36) may constitute a first discharge port (46) and the trash capturing net (38) may constitute a first trash capturing net (50). The sediment settling chamber (22) may further comprise a second discharge port (48) and a second trash capturing net (52). The second trash capturing net (52) is at least partially within the stormwater management chamber (30) and is adjacent the second discharge port (48). The second trash capturing net (52) is adapted and configured to capture trash and debris in stormwater discharged from the second discharge port (48), and has a mouth opening 54 (see FIG. 5) having a mouth area between 100 and 500 square inches. When the second trash capturing net (52) is full, it may be removed, emptied, and reinstalled. The overflow port (42) may constitute a first overflow port (56), and the sediment setting chamber (22) may further comprise a second overflow port (58), the second overflow port (58) is at a higher elevation than the first or second discharge ports (46 and 48) and is positioned and is configured to allow stormwater reaching the elevation of the second overflow port (58) and passing through the second overflow port (58) to flow into the stormwater management chamber (30) without passing through the first or second trash capturing nets (50 and 52). Similarly, the net stand (44) may constitute a first net stand (60) and the underground stormwater management system (20) may further comprise a second net stand (62). The second net stand (62) elevates the second trash capturing net (52) above the chamber floor 32 of the stormwater management chamber 30. Preferably, the second net stand (62) elevates the second trash capturing net (52) at least four inches above the elevation of the chamber floor (32) of the stormwater management chamber (30).

As another example, the sediment settling chamber (22) may constitute a first sediment settling chamber (64) with a first sediment settling chamber floor (68) and a first chamber discharge port (72). The underground stormwater management system (20) may further comprise a second sediment settling chamber (66) having a second sediment settling chamber floor (70) and a second chamber discharge port (74) located at a higher elevation than the second sediment settling chamber floor (70). The plurality of stormwater management cells (24) are downstream of the second sediment settling chamber (66) and are in fluid communication with the second sediment settling chamber (66) via the second chamber discharge port (74).

As a further example, the first sediment settling chamber (64) may comprise a plurality of first chamber discharge ports (76) and the second sediment chamber (66) may comprise a plurality of second chamber discharge ports (78). The underground stormwater management system (20) further comprises a plurality of first chamber trash capturing nets (80) and a plurality of second chamber trash capturing nets (82), each of the plurality of first chamber trash capturing nets (80) being at least partially within the stormwater management chamber (30), and each of the plurality of second chamber trash capturing nets (82) being at least partially within the stormwater management chamber (30). Each of the plurality of first chamber trash capturing nets (80) is adjacent a corresponding one of the plurality of first chamber discharge ports (76), each of the plurality of second chamber trash capturing nets (82) is adjacent a corresponding one of the plurality of second chamber discharge ports (78). The plurality of first chamber trash capturing nets (80) is adapted and configured to capture trash and debris in stormwater discharged from the plurality of first chamber discharge ports (76). The plurality of second chamber trash capturing nets (82) is adapted and configured to capture trash and debris in stormwater discharged from the plurality of second chamber discharge ports (78).

As shown in FIGS. 2 and 7-10, the underground stormwater management chamber 20 may further comprise at least one weir wall 84, a riser 86, a riser intake pipe portion 88, a riser discharge pipe portion 88, a filter sleeve 92, and a flow control orifice 94.

The riser 86 is located downstream of the trash capturing nets and extends from the chamber floor 32 of the stormwater management chamber 30 to a riser height $H_R$. The riser 86 has a riser internal chamber 96. The riser intake pipe portion 88 is within the stormwater management chamber 30 and is in fluid communication with the riser internal chamber 96. The riser intake pipe portion 88 has a height $H_{IPP}$, a length $L_{IPP}$, and a plurality of through holes 98. The plurality of through holes 98 may extend along a portion of the length $L_{IPP}$ of the riser intake pipe portion 88, or the plurality of through holes 98 may extend along the length $L_{IPP}$ of the riser intake pipe portion 88.

The filter sleeve 92 surrounds a length of the riser intake pipe portion 88 and covers the plurality of through holes 98. The plurality of through holes 98 and the filter sleeve 92 are adapted and configured to allow stormwater to flow from the stormwater management chamber 30 through the filter sleeve 92 and the plurality of through holes 98 and into the riser chamber 96.

The filter sleeve 92 may constitute or be comprised of a non-woven fabric. The non-woven fabric comprising filter sleeve 92 has an apparent opening size that permits stormwater to flow through the filter sleeve 92 while retaining silt or other particulate matter. The non-woven fabric may also be capable of filtering and retaining oil-based fluids from the stormwater as it flows through the filter sleeve 92. The non-woven fabric may constitute or comprise, for example, a filter fabric of the type sold under the trademark Adsorb-it®.

The flow control orifice 94 is adapted and configured to control flowrate of stormwater flowing through the riser discharge pipe portion 88 by obstructing a portion of the riser discharge pipe portion 88. By obstructing more of the riser discharge pipe portion 88, the overall flow rate of stormwater through the stormwater management system 20 is decreased. Similarly, by obstructing less of the riser discharge pipe portion 88, the overall flow rate of stormwater through the stormwater management system 20 is increased. The portion of the riser discharge pipe portion 88 that is obstructed by the flow control orifice 94 may vary based on the desired flow rate of stormwater through the stormwater management system 20. Additionally, the flow control orifice 94 may also be adapted and configured to control flowrate of stormwater flowing through the riser intake pipe portion 88 by obstructing a portion of the riser intake pipe portion 88.

The riser height $H_R$ is the maximum desired stormwater level of the stormwater management chamber 30, and the riser 86 is adapted and configured to allow stormwater exceeding the riser height $H_R$ to flow into the riser chamber 96 without first flowing through the riser intake pipe portion 88. During normal flow conditions, the flow control orifice 94, in combination with the filter sleeve 92, restricts the flow rate of stormwater through the riser discharge pipe portion 88 to a rate that is less than the flow rate of stormwater into the underground stormwater management system 20. This allows water to remain within the underground stormwater management system 20 for an extended period of time to promote the settlement of sediment on either the sediment settling chamber floor 34 or the chamber floor 32. But, when the stormwater level rises past the maximum desired stormwater level of the stormwater management chamber 30, the excess stormwater bypasses the filter sleeve 92 and flows directly into the riser internal chamber 96. This allows for a greater flow rate of stormwater so that the level of stormwater within the stormwater management chamber 30 returns to desired levels. If the flow control orifice is also located on the riser intake pipe portion 88, then the excess stormwater also bypasses the flow control orifice, thereby greatly increasing the overall flowrate of stormwater through the stormwater management system 20 until the stormwater level in the stormwater management system 20 returns to desired levels.

The weir wall 84 is located downstream of the trash capturing net 38 and upstream of the riser intake pipe portion 88. The weir wall 84 is adapted and configured to regulate the flow of stormwater in the stormwater management chamber 30 so as to promote settlement of sediment or other particulate matter in the stormwater. The weir wall 84 has a weir wall height $H_{WW}$ that is less than the height $H_{IPP}$ of the riser intake pipe portion 88.

The riser discharge pipe portion 88 is in fluid communication with the riser internal chamber 96, and is adapted and configured to discharge stormwater from the riser internal chamber 96 to out of the stormwater management chamber 30. Generally, the stormwater flowing out of the stormwater management chamber 30 has less trash, silt, or other particulate matter than the stormwater flowing into the underground stormwater management system 20.

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An underground stormwater management system comprising:
　a sediment settling chamber having a sediment settling chamber floor and a discharge port located at a higher elevation than the sediment settling chamber floor;
　a plurality of stormwater management cells located adjacent each other, each of the plurality of cells comprising a body portion and an internal region, each of the plurality of cells being adapted to permit passage of stormwater into and out of the internal region of such cell, the plurality of stormwater management cells combining to form a stormwater management chamber having a chamber floor, the stormwater management chamber being downstream of the sediment settling chamber and the stormwater management chamber being in fluid communication with the sediment settling chamber via the discharge port;
　a trash capturing net at least partially located within the stormwater management chamber, the trash capturing net being adapted and configured to capture trash and debris in stormwater discharged from the discharge port,
　at least one weir wall being located downstream of the trash capturing net, the weir wall being adapted and configured to regulate the flow of stormwater in the stormwater management chamber so as to promote settlement of sediment or other particulate matter in the stormwater.

2. The underground stormwater management system of claim 1 wherein the sediment settling chamber further comprises an overflow port, the overflow port being at a higher elevation than the discharge port, the overflow port being positioned and configured to allow stormwater reaching the elevation of the overflow port and passing through the overflow port to flow into the stormwater management chamber without passing through the trash capturing net.

3. The underground stormwater management system of claim 2 further comprising a net stand, the net stand supporting the trash capturing net and elevating the trash capturing net above the chamber floor of the stormwater management chamber.

4. The underground stormwater management system of claim 2 wherein the discharge port constitutes a first discharge port, the trash capturing net constitutes a first trash capturing net, and the overflow port constitutes a first overflow port;
　the sediment settling chamber further comprises a second discharge port located at a higher elevation than the sediment settling chamber floor;
　the underground stormwater management system further comprises a second trash capturing net, the second trash capturing net being at least partially located within the stormwater management chamber, the second trash capturing net being adapted and configured to capture trash and debris in stormwater discharged from the second discharge port; and
　the sediment settling chamber further comprises a second overflow port, the second overflow port being at a higher elevation than the first or second discharge ports, the second overflow port being positioned and configured to allow stormwater reaching the elevation of the second overflow port and passing through the second overflow port to flow into the stormwater management chamber without passing through the first or second trash capturing nets.

5. The underground stormwater management system of claim 4 further comprising a first net stand and a second net stand, the first net stand supporting the first trash capturing net and elevating the first trash capturing net above the chamber floor of the stormwater management chamber, the second net stand supporting the second trash capturing net and elevating the second trash capturing net above the chamber floor of the stormwater management chamber.

6. The underground stormwater management system of claim 5 wherein the first net stand elevates the first trash capturing net at least 4 inches above the elevation of the chamber floor of the stormwater management chamber; and
　wherein the second net stand elevates the second trash capturing net at least 4 inches above the elevation of the chamber floor of the stormwater management chamber.

7. The underground stormwater management system of claim 1 wherein the discharge port constitutes a first discharge port and the trash capturing net constitutes a first trash capturing net, the sediment settling chamber further comprises a second discharge port, the underground stormwater management system further comprises a second trash capturing net, the second trash capturing net being at least partially within the stormwater management chamber, the second trash capturing net being adjacent the second discharge port, the second trash capturing net being adapted and configured to capture trash and debris in stormwater discharged from the second discharge port.

8. The underground stormwater management system of claim 1 wherein the sediment settling chamber constitutes a first sediment settling chamber, the sediment settling chamber floor constitutes a first sediment settling chamber floor, the discharge port constitutes a first chamber discharge port, and the trash capturing net constitutes a first chamber trash capturing net;
　the underground stormwater management system further comprising a second sediment settling chamber having a second sediment settling chamber floor and a second chamber discharge port located at a higher elevation than the second sediment settling chamber floor, the plurality of stormwater management cells being downstream of the second sediment settling chamber and in fluid communication with the second sediment settling chamber via the second chamber discharge port;
　the underground stormwater management system further comprising a second chamber trash capturing net, the second chamber trash capturing net being at least partially located within the stormwater management chamber and being adapted and configured to capture trash and debris in stormwater discharged from the second chamber discharge port.

9. The underground stormwater management system of claim 8 wherein the first sediment settling chamber comprises a plurality of first chamber discharge ports and the second sediment settling chamber comprises a plurality of second chamber discharge ports, the underground stormwater management system further comprising a plurality of first chamber trash capturing nets and a plurality of second chamber trash capturing nets, each of the plurality of first chamber trash capturing nets being at least partially within the stormwater management system, each of the plurality of second chamber trash capturing nets being at least partially within the stormwater management chamber, each of the plurality of first chamber trash capturing nets being adjacent a corresponding one of the plurality of first chamber discharge ports, each of the plurality of second chamber trash capturing nets being adjacent a corresponding one of the plurality of second chamber discharge ports, the plurality of first chamber trash capturing nets being adapted and configured to capture trash and debris in stormwater discharged from the plurality of first chamber discharge ports, the plurality of second chamber trash capturing nets being adapted and configured to capture trash and debris in stormwater discharged from the plurality of second chamber discharge ports.

10. The underground stormwater management system of claim 9 wherein each of the first and second trash capturing nets has a mouth having a mouth area between 100 square inches and 898 square inches.

11. A underground stormwater management system comprising:
a sediment settling chamber having a sediment settling chamber floor and a discharge port located at a higher elevation than the sediment settling chamber floor;
a plurality of stormwater management cells located adjacent each other, each of the plurality of cells comprising a body portion and an internal region, each of the plurality of cells being adapted to permit passage of stormwater into and out of the internal region of such cell, the plurality of stormwater management cells combining to form a stormwater management chamber having a chamber floor, the stormwater management chamber being downstream of the sediment settling chamber and the stormwater management chamber being in fluid communication with the sediment settling chamber via the discharge port;
a riser extending from the chamber floor of the stormwater management chamber to a riser height, the riser having an internal riser chamber;
a riser intake pipe portion;
a riser discharge pipe portion;
a filter sleeve;
a flow control orifice;
the riser intake pipe portion being within the stormwater management chamber and being in fluid communication with the riser chamber;
the filter sleeve surrounding a length of the riser intake pipe portion, the flow control orifice being adapted and configured to control flowrate of stormwater flowing through the stormwater management chamber;
the riser height being the maximum desired stormwater level of the stormwater management chamber, the riser being adapted and configured to allow stormwater exceeding the riser height to flow into the riser chamber without first flowing through the riser intake pipe portion;
the riser discharge pipe portion being in fluid communication with the riser chamber, the riser discharge pipe portion being adapted and configured to discharge stormwater from the riser chamber to out of the stormwater management chamber.

12. The underground stormwater management system of claim 11 wherein the riser intake pipe portion has a plurality of through holes, the filter sleeve covering the plurality of through holes; and
wherein the plurality of through holes and the filter sleeve are adapted and configured to allow stormwater to flow from the stormwater management chamber through the filter sleeve and the plurality of through holes and into the riser chamber.

13. The underground stormwater management system of claim 12 wherein the plurality of through holes are along the length of the riser intake pipe portion.

14. The stormwater management system of claim 11 wherein the filter sleeve comprises a non-woven fabric.

15. The stormwater management system of claim 14 wherein the filter sleeve is adapted and configured to filter oil-based fluids from the stormwater flowing from the stormwater management chamber to the first outlet pipe.

16. The stormwater management system of claim 11 further comprising a trash capturing net at least partially located within the stormwater management chamber, the trash capturing net being adapted and configured to capture trash and debris in stormwater discharged from the discharge port.

17. The stormwater management system of claim 16 further comprising an overflow port, the overflow port being at a higher elevation than the discharge port, the overflow port being positioned and configured to allow stormwater reaching the elevation of the overflow port and passing through the overflow port to flow into the stormwater management chamber without passing through the trash capturing net.

18. The stormwater management system of claim 17 further wherein the riser intake pipe portion has a riser intake pipe portion height; and
wherein the stormwater management chamber further comprises at least one weir wall being located downstream of the trash capturing net, the weir wall having a weir wall height that is less than the riser intake pipe portion height, the weir wall being adapted and configured to regulate the flow of stormwater in the stormwater management chamber so as to promote settlement of sediment or other particulate matter in the stormwater.

19. A underground stormwater management system comprising:
a sediment settling chamber having a sediment settling chamber floor, a discharge port located at a higher elevation than the sediment settling chamber floor, and an overflow port located at a higher elevation than the discharge port;
a plurality of stormwater management cells located adjacent each other, each of the plurality of cells comprising a body portion and an internal region, each of the plurality of cells being adapted to permit passage of stormwater into and out of the internal region of such cell, the plurality of stormwater management cells combining to form a stormwater management chamber having a chamber floor, the stormwater management chamber being downstream of the sediment settling chamber and the stormwater management chamber being in fluid communication with the sediment settling chamber via the discharge port;
a trash capturing net at least partially located within the stormwater management chamber, the trash capturing net being adapted and configured to capture trash and debris in stormwater discharged from the discharge port; and
at least one weir wall being located downstream of the trash capturing net, the weir wall being adapted and configured to regulate the flow of stormwater in the stormwater management chamber so as to promote settlement of sediment or other particulate matter in the stormwater.

20. The stormwater management system of claim 19 wherein the sediment settling chamber further comprises an overflow port, the overflow port being at a higher elevation than the discharge port.

* * * * *